United States Patent [19]
Tabuchi

[11] Patent Number: 5,391,969
[45] Date of Patent: Feb. 21, 1995

[54] MOTOR SERVO SYSTEM

[75] Inventor: Junichiro Tabuchi, Tondabayashi, Japan

[73] Assignee: Sanyo Electric Co., Ltd., Moriguchi, Japan

[21] Appl. No.: 37,166

[22] Filed: Mar. 26, 1993

[30] Foreign Application Priority Data

Mar. 27, 1992 [JP] Japan .................. 4-070890

[51] Int. Cl.$^6$ .................. G05D 13/62; G11B 15/46
[52] U.S. Cl. .................. 318/611; 318/606; 318/615; 318/608
[58] Field of Search .............. 318/560, 561, 565, 606, 318/608, 611, 615, 623, 618

[56] References Cited

U.S. PATENT DOCUMENTS

| 5,173,649 | 12/1992 | Wise | 318/615 |
| 5,204,601 | 4/1993 | Hirata et al. | 318/606 |

FOREIGN PATENT DOCUMENTS

| 0448136 | 9/1991 | European Pat. Off. . |
| 3722099 | 1/1988 | Germany . |
| 4213795 | 10/1992 | Germany . |

*Primary Examiner*—Bentsu Ro
*Attorney, Agent, or Firm*—Armstrong, Westerman, Hattori, McLeland & Naughton

[57] ABSTRACT

A motor servo system for controlling a motor includes a first synthesizing portion which synthesizes a speed detection signal and a phase detection signal with each other to produce a synthesized signal which is in turn filtered by a low-pass filter portion and then becomes a first motor control signal. The first motor control signal is applied to an equivalent motor portion (software motor) which is included in an observer and has a transfer function of as the same as that of the motor. A detection signal which is detected by the equivalent motor portion and a synthesized signal from the synthesizing portion are compared with each other by a first comparing portion. An output signal of the first comparing portion is applied to a second comparing portion or a second synthesizing portion. By subtracting an output signal of the first comparing portion from the first motor control signal by the second comparing portion, or by synthesizing the output signal of the first comparing portion from the first motor control signal, a second motor control signal by which the motor is to be controlled.

8 Claims, 8 Drawing Sheets

F I G. 6
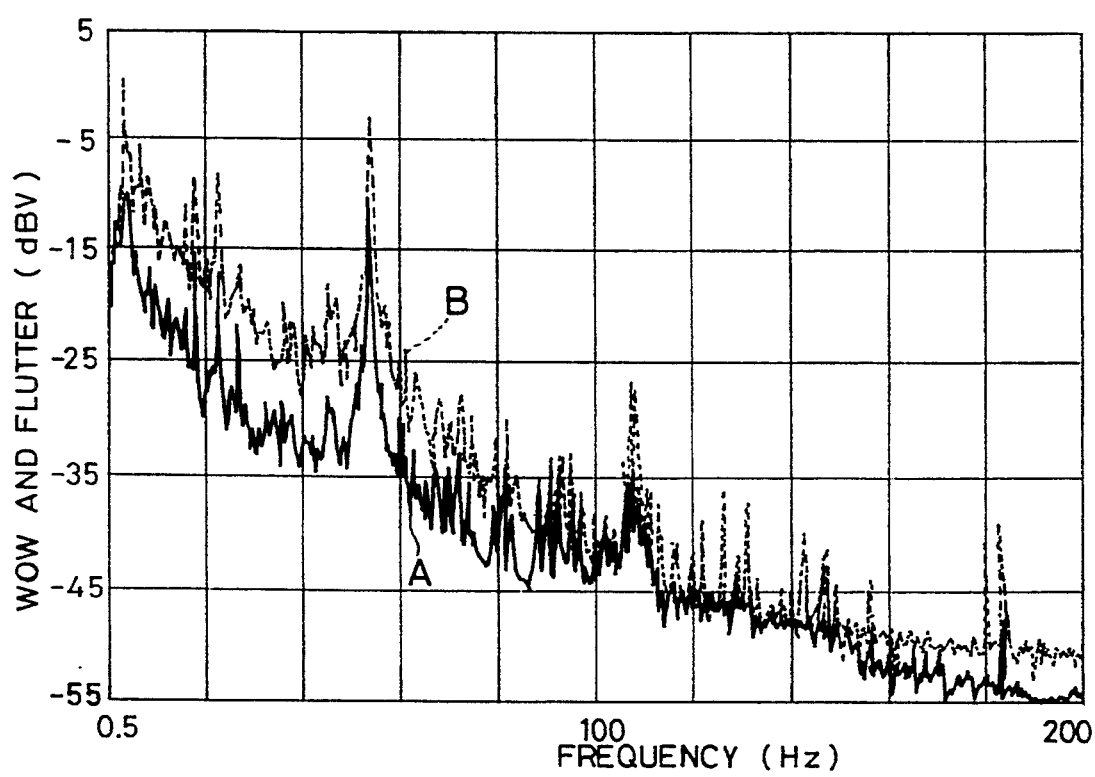

MOTOR SERVO SYSTEM

BACKGROUND OF THE INVENTION

1. Field of the Invention

The present invention generally relates to a motor servo system. More specifically, the present invention relates to a motor servo system which can be utilized in a servo system for suppressing irregularity of an FG signal which is generated by a drum motor of a VTR and causes rotation irregularity, or a servo system for controlling a motor such as a capstan motor of a VTR, in which desired responsibility cannot be obtained due to coggings, change of load, and so on.

2. Description of the prior art

As a conventional motor servo system 1 by which the irregularity of an FG signal (hereinafter, simply called as "FG irregularity") can be suppressed, in order to remove a signal component of the FG irregularity from a motor control signal, there was a circuit in which an analog notch filter 2 is inserted as shown in FIG. 7, or a circuit in which a digital notch filter 3 is inserted as shown in FIG. 8. In addition, as the digital notch filter 3 shown in FIG. 8, a circuit as shown in FIG. 9 can be utilized, for example.

In addition, as a conventional motor servo system 1' for controlling a capstan motor 4 of a VTR, there was an circuit as shown in FIG. 10, in which a speed detection and a phase detection are performed on the basis of the FG signal, and these detection signals are synthesized with each other, and thereafter, a motor control signal is applied to the capstan motor 4 through a low-pass filter portion 5, D/A converting portion 6, and etc.

In the analog notch filter 2 utilized in the motor servo system 1 shown in FIG. 7, there is a case where deviation occurs in a center frequency of a notch due to fluctuation of an electronic parts, and therefore, an effect of the notch is decreased.

In addition, in the digital notch filter 3 utilized in the motor servo system i shown in FIG. 8, no deviation occurs in the center frequency, but a RAM time and a CPU time become very long. Especially, in a case where the digital notch filter is utilized for removing the FG irregularity of the drum, the larger sampling times for one rotation, the larger number of delay times, and therefore, the CPU time becomes large. On the other hand, in such a system where a servo control microcomputer and a system control microcomputer are included in the same microcomputer, since the CPU time cannot be dedicated only by the servo control microcomputer, it is impossible to increase enough the sampling frequency by the servo microcomputer, that is, the number of delay times of the notch, and therefore, sufficient security cannot obtained.

Furthermore, in a case where a motor having large coggings or a large change of load is controlled by the motor servo system 1' shown in FIG. 10, although it is necessary to make a servo gain very large, in the past, there was not a way other than a way wherein the servo gain is increased by increasing the sampling frequency. However, when a motor is miniaturized, there was a problem that the coggings or the change of load becomes large, on the other hand, the sampling frequency decreases because the number of magnetization of the motor is decreased, and therefore, it is impossible to suppress enough the irregularity of the rotation of the motor.

SUMMARY OF THE INVENTION

Therefore, a principal object of the present invention is to provide a motor servo system in which a motor can be controlled stably with a simple software even if there is FG irregularity.

Another object of the present invention is to provide a motor servo system in which it is possible to increase a servo gain even if a disturbance such change of load is large.

A motor servo system in accordance with the present invention controls a motor on the basis of a speed detection signal and a phase detection signal. The motor servo system comprises: first synthesizing means for synthesizing the speed detection signal and the phase detection signal with each other with a predetermined synthesizing ratio so as to produce a synthesized signal; equivalent motor means having a transfer function representative of a transfer characteristic of the motor and for producing a detection signal on the basis of the synthesized signal; first comparing means for comparing the synthesized signal and the detection signal; and motor control signal generating means for generating a motor control signal by which tile motor is to be controlled on the basis of the synthesized signal and an output signal of the first comparing means.

In the present invention, the speed detection signal is produced by a speed detecting portion which produces the speed detection signal on the basis of, for example, an FG signal from the motor. A phase detecting portion produces the phase detection signal on the basis of, for example, a PG signal from the motor, or by integrating the speed detection signal. The first synthesizing means receives the speed detection signal and the phase detection signal, and produces the synthesized signal which is applied to the motor control signal generating means and the first comparing means, respectively.

The equivalent motor means is a kind of a software motor, and has a transfer function as the same or similar to that of the motor to be controlled. The equivalent motor means receives the output signal of the first synthesizing means through low-pass filter means, for example. The detection signal of the equivalent motor means is compared with the synthesized signal of the first synthesizing means, and therefore, the output of the first comparing means becomes a signal representing only an FG irregularity component or a disturbance component. Therefore, the motor control signal outputted by the motor control signal generating means does not include such the FG irregularity component or the disturbance component.

In accordance with the present invention, the motor can be servo-controlled stably.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a graph showing a spectrum of a wow and flutter of FIG. 5 embodiment;

DETAILED DESCRIPTION OF THE PREFERRED EMBODIMENTS

Figure 1:
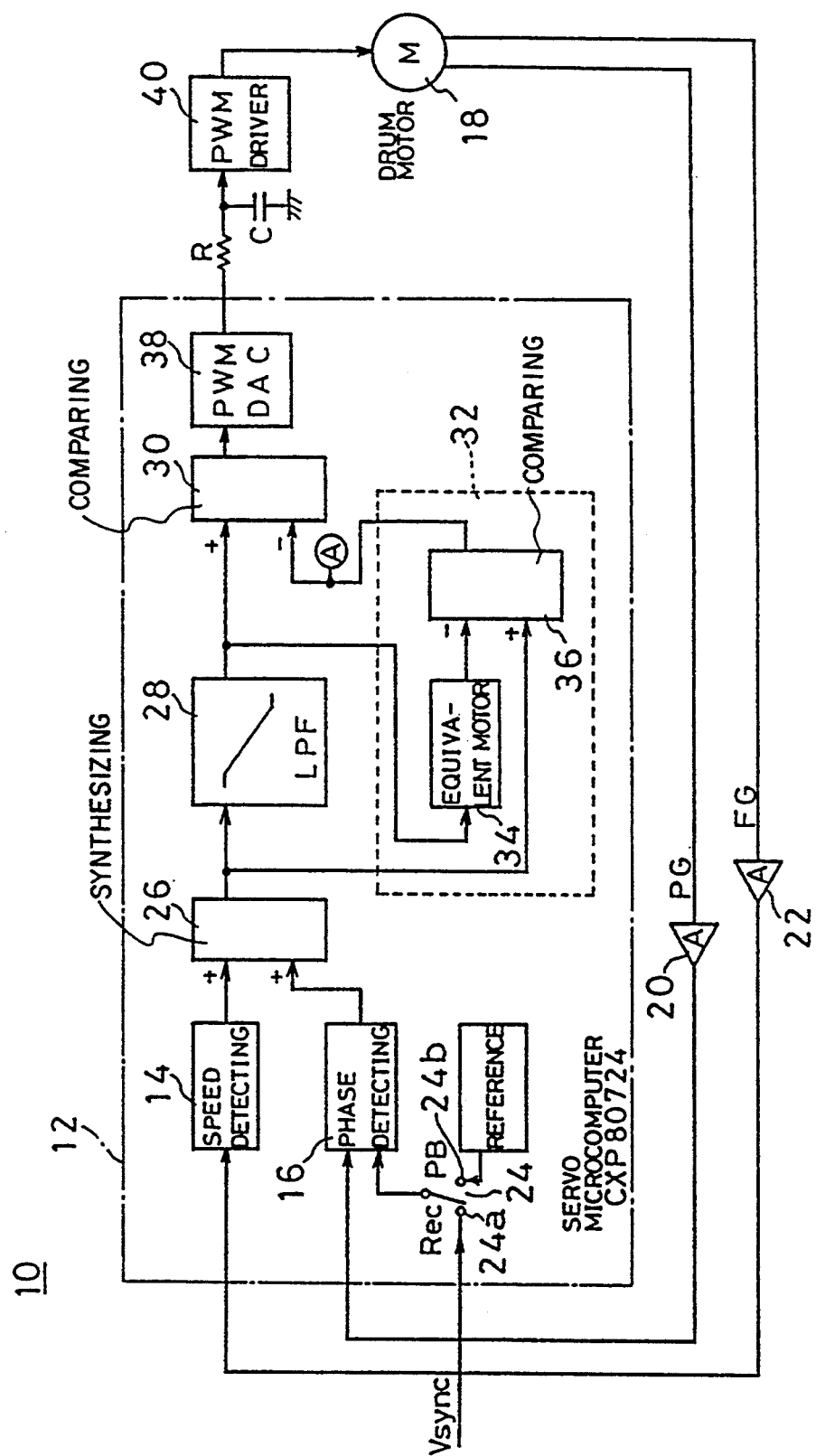
FIG. 1 is a functional block diagram showing one embodiment in accordance with the present invention.

With referring to FIG. 1, a motor servo system 10 of this embodiment shown is utilized for removing the FG irregularity in a drum servo system by utilizing robust control, and includes a servo control microcomputer 12. As the microcomputer 12, a servo microcomputer "CXP80724".

The microcomputer 12 includes a speed detection portion 14 and a phase detection portion 16. A PG pulse and an FG pulse from a drum motor 18 are amplified by a PG amplifier 20 and an FG amplifier 22, and then, the PG pulse and FG pulse are applied to the speed detection portion 14 and the phase detection portion 16, respectively.

In the speed detection portion 14, a speed detection signal is obtained by counting a period of the FG pulse. In the phase detection portion 16, a phase detection signal is obtained by comparing a phase of the PG pulse and a phase of a vertical synchronization signal Vsync which is applied by connecting a switch 24 to a terminal 24a in a recording mode. In a play-back mode, the switch 24 is connected to a terminal 24b, and therefore, a reference signal is applied to the phase detection portion 16, and accordingly, a phase detection signal is obtained by detecting a phase difference between the reference signal and the PG pulse.

The speed detection signal and the phase detection signal are combined or synthesized with each other by a synthesizing portion 26, whereby a detection signal is obtained. The detection signal becomes a motor control signal through a low-pass filter portion 28. The motor control signal is applied to both of a comparing portion 30 and an equivalent motor portion (software motor) 34 of an observer 32, respectively.

Figure 2:
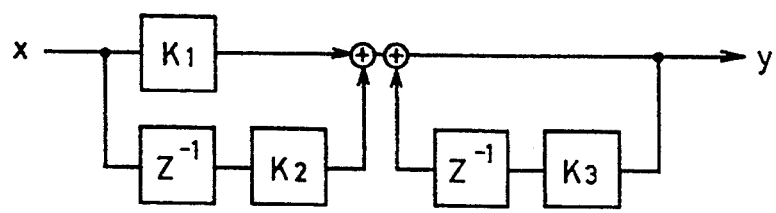
FIG. 2 is a functional circuit diagram showing a equivalent motor portion of FIG. 1 embodiment.
Figure 3:
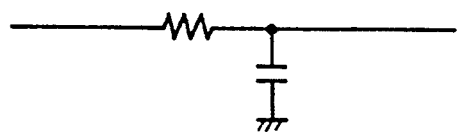
FIG. 3 is a functional circuit diagram showing a low-pass filter portion having a transfer function as the same as that of the equivalent motor portion.

The equivalent motor portion 34 has a transfer characteristic equivalent to that of the drum motor 18. For the equivalent motor portion 34, a circuit shown in FIG. 2 is utilized. In addition, the equivalent motor portion 34 can be represented by the same transfer function of an RC low-pass filter shown in FIG. 3. The transfer function of the circuit shown in FIG. 2 is represented by the following equation.

$$
\begin{aligned}
y(nT) &= K_1 x(nT) + K_2 x(nT-T) + K_3 y(nT-T) \\
&= y(nT-T) + a\{x(nT) - y(nT-T)\} + \\
&\quad b\{x(nT) - x(nT-T)\}
\end{aligned}
\quad (1)
$$

where, x is an input signal, y is an output signal, and T is a sampling frequency.

Figure 4:
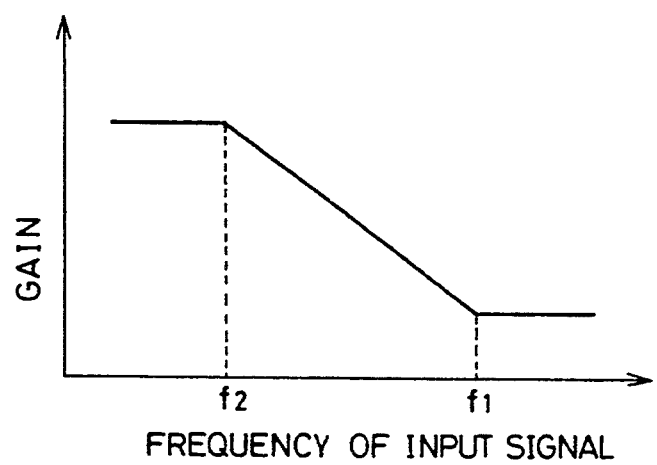
FIG. 4 is a graph showing a gain characteristic of FIG. 2 functional circuit.

A gain characteristic of the transfer function represented by the equation 1 is shown in FIG. 4. In FIG. 4, frequencies $f_1$ and $f_2$ are respectively represented by the following equations 2 and 3.

$$f_1 = \frac{a}{\pi(2b+a)T} \quad (2)$$

$$f_2 = \frac{a}{\pi(2-a)T} \quad (3)$$

Then, if $2b+a=0$, $f_1 = \infty$ (infinity), and therefore, the circuit shown in FIG. 2 functions a low-pass filter. Accordingly, the circuit shown in FIG. 2 becomes a circuit equivalent to the drum motor 18.

By comparing the detection signal from the equivalent motor portion 34 and the detection signal from the synthesizing portion 26 by a comparing portion 36, a comparative signal A is obtained. In the comparing portion 30, the comparative signal A is subtracted from the motor control signal outputted from the low-pass filter portion 28. At this time, no FG irregularity occurs in the equivalent motor 34, but the FG irregularity exists in the drum motor 18, and therefore, a signal spectrum of only the FG irregularity is included in the comparative signal (A). Therefore, by subtracting the signal spectrum of the FG irregularity, that is, the comparative signal (A) from the motor control signal, it is possible to remove only an FG irregularity component from the motor control signal.

The motor control signal from which the comparative signal (A) is subtracted is D/A converted by a D/A converting portion 38 of a PWM system, and thereafter, the motor control signal is smoothed by a resistor R and a capacitor C so as to be applied to a PWM driver 42, whereby the drum motor 18 can be controlled.

In the motor servo system 10, since no reduction of a DC gain occurs as different from a digital notch filter, it is possible to remove the FG irregularity components included in the both of the speed detection signal and the phase detection signal. Furthermore, it is possible to also eliminate a false signal spectrum other than the FG irregularity.

Figure 5:
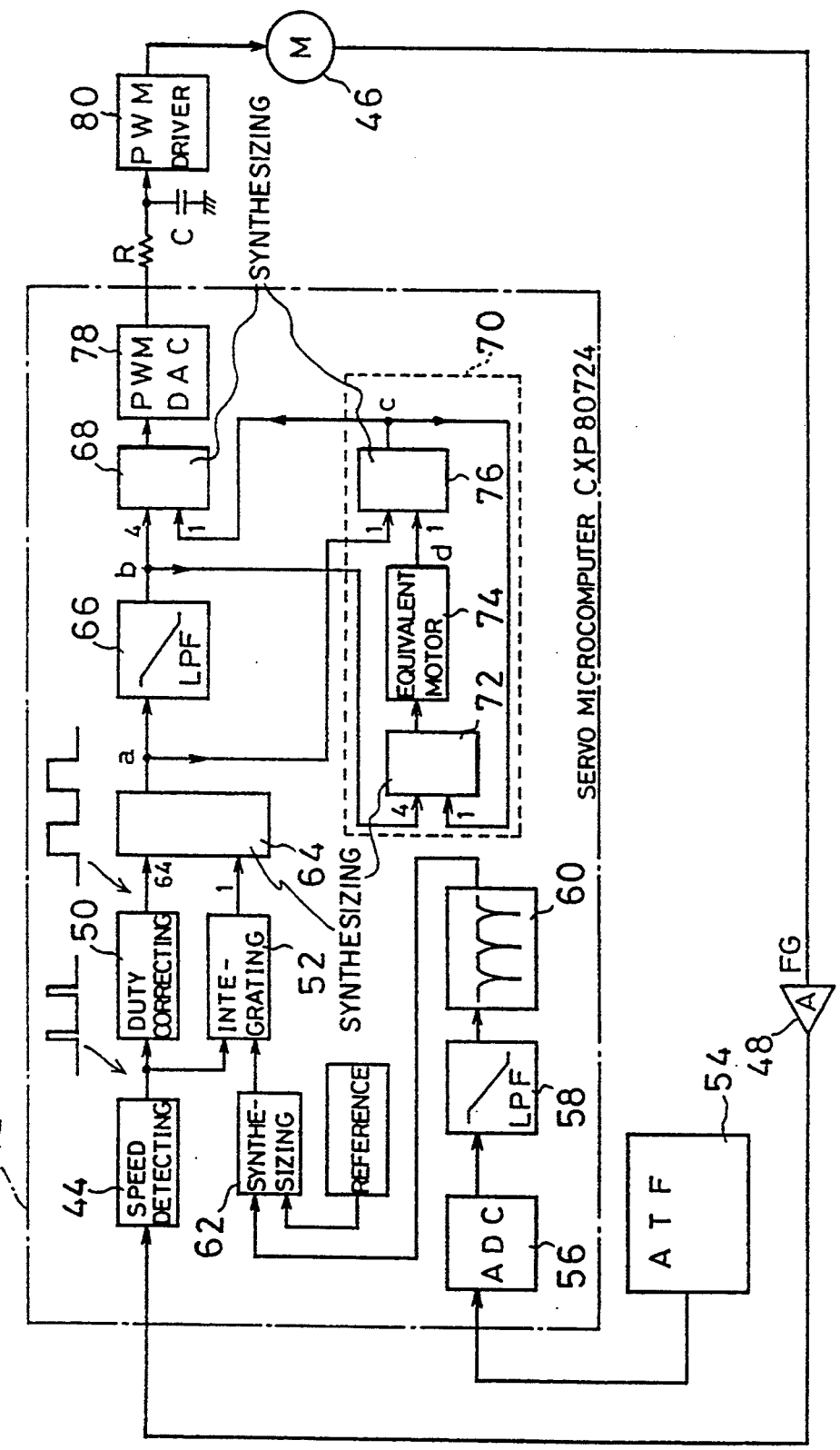
FIG. 5 is a functional block diagram showing another embodiment in accordance with the present invention.
Figure 7:
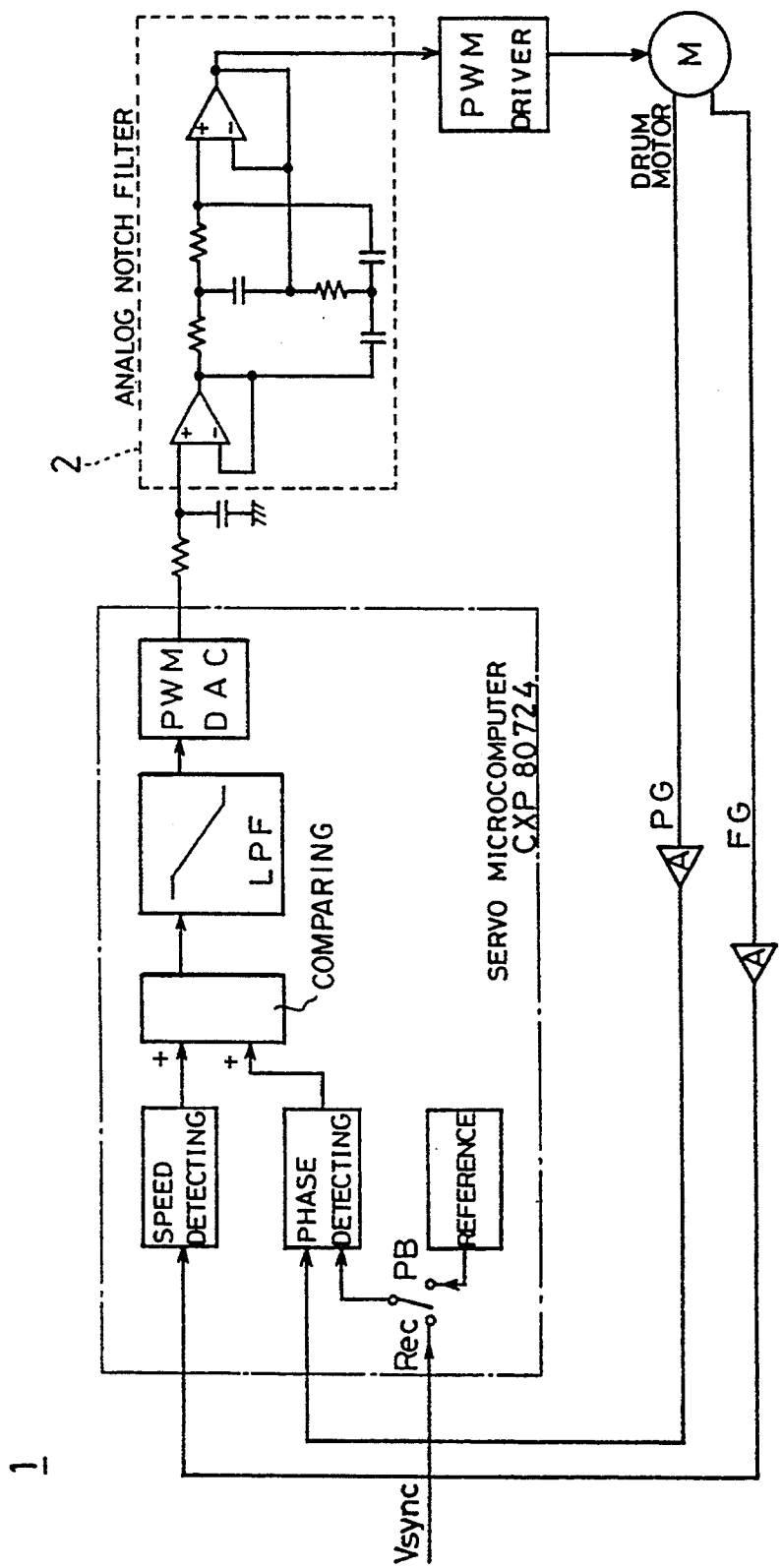
FIG. 7 is a functional block diagram showing a prior art.
Figure 8:
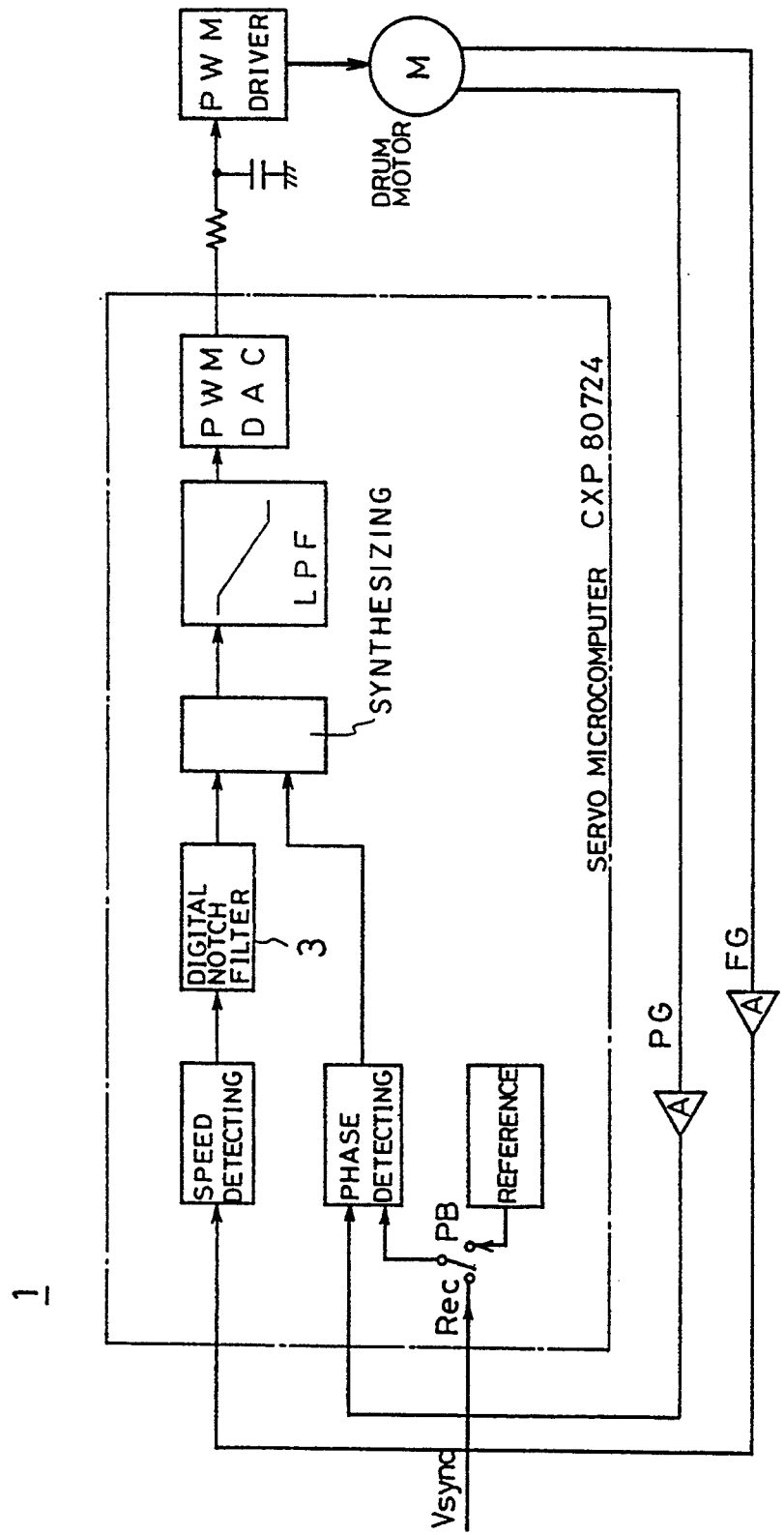
FIG. 8 is a functional block diagram showing another prior art.
Figure 9:
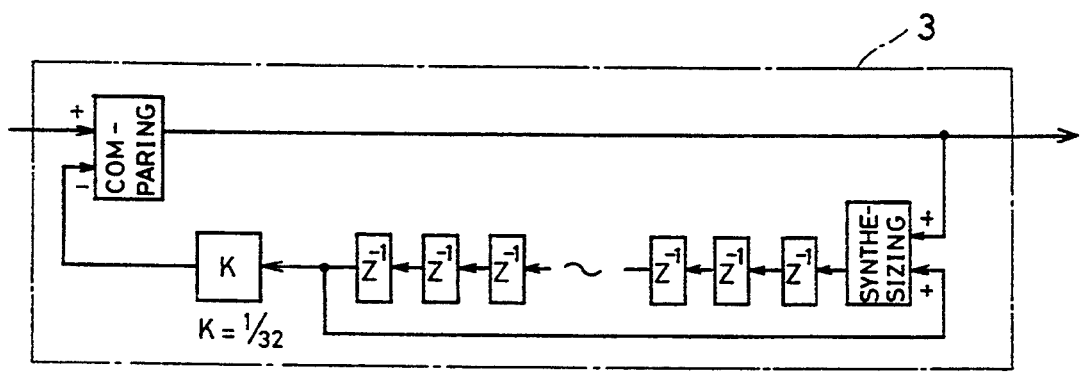
FIG. 9 is a functional circuit diagram showing a digital notch filter utilized in FIG. 8 prior art.
Figure 10:
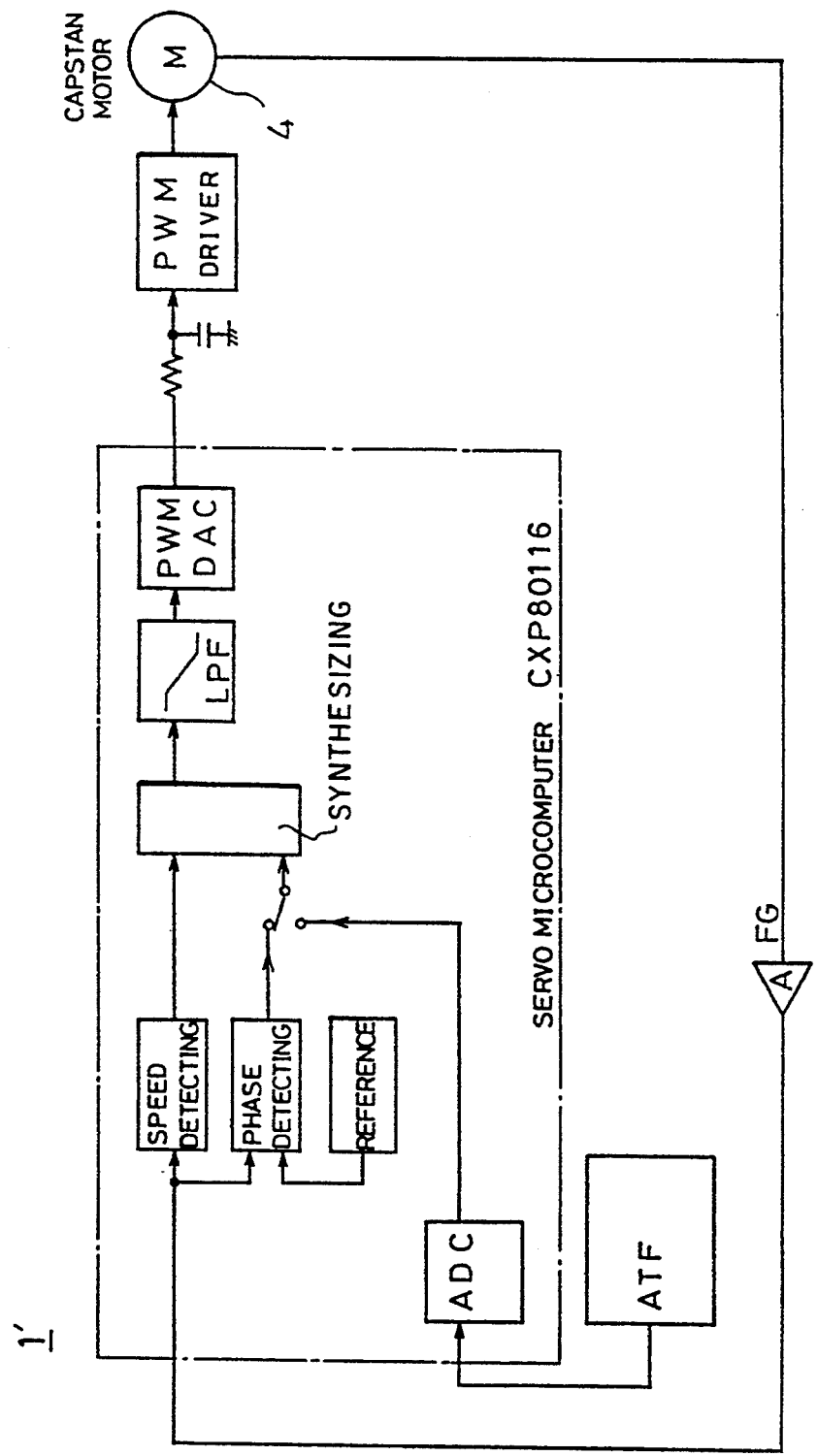
FIG. 10 is a functional block diagram showing still another prior art.

With referring to FIG. 5, a motor servo system 10' according to another embodiment robust-controls a capstan servo system (software servo) of an 8 m/m VTR. The motor servo system 10' includes a servo control microcomputer 42. As the microcomputer 42, the servo microcomputer "CXP80724" can be also utilized, for example.

The microcomputer 42 includes a speed detection portion 44 to which an FG pulse from a capstan motor 46 is inputted after the same is amplified by an FG amplifier 48. By counting a period of the FG pulse, a speed detection signal is obtained by the speed detection signal 44. A duty ratio of the speed detection signal is corrected by a duty correcting portion 50.

In addition, in a recording mode, a phase detection is produced by integrating the speed detection signal by a phase detection portion 52. In a play-back mode, a reference signal which is to be integrated by the phase detecting portion 52 is changed in accordance with a tracking signal. In this embodiment shown, an integration type of a phase detection is utilized in both of the recording mode and the play mode. In addition, an analog signal from an ATF processing portion 54 is A/D converted in an A/D converting portion 56 and data from the D/A converting portion 56 is filtered by a low-pass filter portion 58 and a comb-type filter 60, and then applied to a synthesizing portion 62. In the synthesizing portion 62, the tracking signal is produced by adding a reference signal to the data.

Then, the speed detection signal from the duty correcting portion 50 and the phase detection signal from the phase detection portion 52 are applied to a synthesizing portion 64, and a synthesized signal is produced. A synthesizing ratio at this time is set as such that the speed detection signal: the phase detection signal=64:1, for example, in this embodiment. However, such a synthesizing ratio can be adjusted according to a characteristic of a servo system.

Then, a motor control signal (b) which is optimized is produced by passing the synthesized signal (a) through a low-pass filter portion 66. The motor control signal (b) is applied to a synthesizing portion 68 and a synthesizing portion 72 of an observer 70. A comparative signal (c) from a comparing portion 76 (described later) is fed-back to the synthesizing portion 72, and then, the motor control signal (b) and the comparative signal (c) are synthesized with each other with a weight of 4:1, for example.

A synthesized signal of the motor control signal (b) and the comparative signal (c) is applied to an equivalent motor portion (software motor) 74 having a transfer characteristic as the same as that of the capstan motor 46.

In the comparing portion 76, a detection signal (d) of the equivalent motor portion 74 and the synthesized signal (a) from the synthesizing portion 64 are compared with each other with a weight of 1:1, for example, whereby the comparative signal (c) is obtained. The comparative signal (c) is fed-back to the synthesizing portion 72 as described above, and applied to the synthesizing portion 68.

In the synthesizing portion 68, the motor control signal (b) and the comparative signal (c) are combined or synthesized with a weight of 4:1, for example. In addition, it is needless to say that such synthesizing ratios in the synthesizing portions 66 and 72 can be also adjusted according to a characteristic of a servo system.

A synthesized signal from the synthesizing portion 68, that is, the motor control signal is D/A converted by a D/A converting portion 78 of a PWM system, and then, smoothed by a resistor R and a capacitor C so as to be applied to a PWM driver 80, whereby the capstan motor 46 can be controlled.

In such the motor servo system 10', a spectrum represented by a relative value of a wow and flutter of the capstan motor is shown in FIG. 6. As well seen from FIG. 6, a spectrum A of the motor servo system 10' is largely decreased in comparison with a spectrum B of the prior art within a servo frequency region of approximately 100 Hz. Thus, in the motor servo system 10', a spectrum component due to a difference between an ideal motor and a practical motor can be largely fed-back, and therefore, in comparison with a servo system of the prior art, an effect for suppressing a change of load becomes large.

In addition, it is needless to say that although respective functions to be executed by the servo control microcomputer are illustrated as respective functional blocks in FIG. 1 embodiment and FIG. 5 embodiment, in practice, the respective functional blocks can be performed by executing programs. Of course, such the respective functional blocks, however, may be implement by hardware circuit.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motor servo system for controlling a motor on the basis of a speed detection signal and a phase detection signal, comprising:
   first synthesizing means for synthesizing said speed detection signal and said phase detection signal with each other with a predetermined synthesizing ratio so as to produce a synthesized signal;
   equivalent motor means having a transfer function representative of a transfer characteristic of said motor and for producing a detection signal on the basis of said synthesized signal;
   first comparing means for comparing said synthesized signal and said detection signal; and
   motor control signal generating means for generating a motor control signal by which said motor is to be controlled on the basis of said synthesized signal and an output signal of said first comparing means.

2. A motor servo system according to claim 1, wherein said motor control signal generating means includes second comparing means for comparing said output signal of said first comparing means and said synthesized signal with each other.

3. A motor servo system according to claim 1, wherein said motor control signal generating means includes second synthesizing means for synthesizing said output signal of said first comparing means and said synthesized signal with each other with a predetermined synthesizing ratio.

4. A motor servo system according to claim 3, wherein said equivalent motor means includes an equivalent motor, and said system further comprising a third synthesizing means for synthesizing said synthesized signal and said output signal of said first comparing means with each other with a predetermined synthesizing ratio, an output signal of said third synthesizing means being applied to said equivalent motor, and an output signal of said equivalent motor being applied to said first comparing means as said detection signal.

5. A motor servo system according to claim 1, further comprising low-pass filter means for filtering said synthesized signal, wherein said equivalent motor means receives an output signal of said low-pass filter means to produce said detection signal.

6. A motor servo system according to claim 5, wherein said motor control signal generating means includes second comparing means for comparing said output signal of said first comparing means and an output signal of said low-pass filter means with each other with a predetermined synthesizing ratio.

7. A motor servo system according to claim 6, wherein said equivalent motor means includes an equivalent motor, and said system further comprising a third synthesizing means for synthesizing said output signal of said low-pass filter means and said output signal of said first comparing means with each other with a predetermined synthesizing ratio, an output signal of said third synthesizing means being applied to said equivalent motor, and an output signal of said equivalent motor being applied to said first comparing means as said detection signal.

8. A motor servo system for controlling a motor on the basis of a speed detection signal and a phase detection signal, comprising:

first synthesizing means for synthesizing said speed detection signal and said phase detection signal with each other with a predetermined synthesizing ratio so as to produce a synthesized signal;

equivalent motor means having a transfer function representative of a transfer characteristic of said motor and for producing a detection signal on the basis of said synthesized signal;

first comparing means for comparing said synthesized signal and said detection signal;

second synthesizing means for synthesizing an output signal of said first comparing means and said synthesized signal with each other with a predetermined synthesizing ratio.

* * * * *